United States Patent
Oh et al.

(10) Patent No.: US 9,229,913 B2
(45) Date of Patent: Jan. 5, 2016

(54) FONT PROCESSING METHOD FOR MAINTAINING E-DOCUMENT LAYOUT

(71) Applicant: INFRAWARE INC., Seoul (KR)

(72) Inventors: Jae-Chun Oh, Gyeonggi-do (KR); Dae-Won Chun, Seoul (KR)

(73) Assignee: INFRAWARE INC., Seoul (KR)

(*) Notice: Subject to any disclaimer, the term of this patent is extended or adjusted under 35 U.S.C. 154(b) by 246 days.

(21) Appl. No.: 14/022,965

(22) Filed: Sep. 10, 2013

(65) Prior Publication Data

US 2014/0089790 A1 Mar. 27, 2014

(30) Foreign Application Priority Data

Sep. 27, 2012 (KR) .................. 10-2012-0107755
Jun. 3, 2013 (KR) .................. 10-2013-0063735

(51) Int. Cl.
*G06F 17/00* (2006.01)
*G06F 17/21* (2006.01)

(52) U.S. Cl.
CPC .................. *G06F 17/214* (2013.01)

(58) Field of Classification Search
CPC ...... G06F 17/214; G06F 17/212; G06F 17/24
See application file for complete search history.

(56) References Cited

U.S. PATENT DOCUMENTS

| | | | | |
|---|---|---|---|---|
| 5,233,685 A * | 8/1993 | Landes et al. | .................. | 715/234 |
| 5,444,840 A * | 8/1995 | Froessl | .................. | 1/1 |
| 5,459,827 A * | 10/1995 | Allouche et al. | ............... | 715/204 |
| 5,533,174 A * | 7/1996 | Flowers et al. | ............... | 358/1.15 |
| 5,953,735 A * | 9/1999 | Forcier | .................. | 715/273 |
| 6,256,650 B1 * | 7/2001 | Cedar et al. | .................. | 715/235 |
| 6,336,124 B1 * | 1/2002 | Alam et al. | .................. | 715/205 |
| 6,975,412 B2 * | 12/2005 | Daniels et al. | ............... | 358/1.11 |
| 7,478,324 B1 * | 1/2009 | Ohtsu | .................. | 715/255 |
| 7,478,325 B2 * | 1/2009 | Foehr et al. | .................. | 715/269 |
| 7,739,584 B2 * | 6/2010 | Vella et al. | .................. | 715/203 |
| 8,001,465 B2 * | 8/2011 | Kudrolli | ............... | G06F 17/246 715/200 |
| 8,385,652 B2 * | 2/2013 | Mitic | .................. | 382/177 |
| 2004/0123243 A1 * | 6/2004 | Everett | ............... | G06F 17/214 715/251 |
| 2004/0139400 A1 * | 7/2004 | Allam et al. | .................. | 715/526 |
| 2004/0215472 A1 * | 10/2004 | Gleckman | .................. | 705/1 |
| 2005/0094208 A1 * | 5/2005 | Mori | .................. | 358/1.18 |
| 2006/0072137 A1 * | 4/2006 | Nishikawa et al. | ............. | 358/1.11 |
| 2007/0061488 A1 * | 3/2007 | Alagappan | ........ | G06F 17/30905 709/246 |

(Continued)

FOREIGN PATENT DOCUMENTS

| | | |
|---|---|---|
| JP | 2004-093931 | 3/2004 |
| KR | 2008-0048157 | 6/2008 |

(Continued)

*Primary Examiner* — Laurie Ries
(74) *Attorney, Agent, or Firm* — Greenblum & Bernstein, P.L.C.

(57) ABSTRACT

The present invention relates to a font processing technique for maintaining e-document layout. More particularly, the present invention relates to a font processing technique for a user terminal (e.g., smart phone, smart pad, digital set-top box) displaying or printing an e-document (e.g., word file, presentation file) to approximately maintain original layout of the e-document even though lacking of original font of the e-document. According to the present invention, when a user terminal displays or prints an e-document, the original layout of the e-document is maintained even though the user terminal fails to install original fonts. Therefore, the meaning of the e-document is exactly shown as intended by the author. Further, the visibility and legibility of the e-document is highly enhanced.

10 Claims, 6 Drawing Sheets

(56) References Cited

U.S. PATENT DOCUMENTS

| | | | |
|---|---|---|---|
| 2007/0127072 A1* | 6/2007 | Katsuragi | 358/1.18 |
| 2007/0192687 A1* | 8/2007 | Simard et al. | 715/523 |
| 2008/0320386 A1* | 12/2008 | Balzano et al. | 715/256 |
| 2009/0055509 A1* | 2/2009 | Choi et al. | 709/217 |
| 2009/0309894 A1* | 12/2009 | Lam | G06F 17/211 345/582 |
| 2010/0313106 A1* | 12/2010 | Callens et al. | 715/201 |
| 2012/0002226 A1* | 1/2012 | Zhan | G06F 3/1205 358/1.11 |
| 2012/0229517 A1* | 9/2012 | Plummer | 345/660 |
| 2013/0014007 A1* | 1/2013 | Kopp et al. | 715/243 |

FOREIGN PATENT DOCUMENTS

| | | |
|---|---|---|
| KR | 10-2009-0036456 | 4/2009 |
| KR | 10-2010-0028414 | 3/2010 |

* cited by examiner

FONT PROCESSING METHOD FOR MAINTAINING E-DOCUMENT LAYOUT

BACKGROUND OF THE INVENTION

The present invention relates to a font processing technique for maintaining e-document layout. More particularly, the present invention relates to a font processing technique for a user terminal (e.g., smart phone, smart pad, digital set-top box) displaying or printing an electronic document (e-document) (e.g., word file, presentation file) to approximately maintain original layout of the e-document even though lacking of original font of the e-document.

Recently, user terminals such as smart phones, smart pads and digital set-top boxes are widely spread. In user terminals, a software (e.g., POLARIS OFFICE of Infraware Inc.) generally opens an e-document such as a word file (e.g., DOC file), a presentation file (e.g., PPT file). The software displays each character of the e-document with considering font option for each character.

A user terminal may fail to install some of original fonts used for authoring the e-document. In that case, a personal computer may instantly download through Internet font data of the original font.

However, mobile terminals such as smart phones and smart pads may be unwilling to use such approach, because due to poor mobile communication environment such approach renders the responsiveness of the mobile terminal to become lowered. Rather, mobile terminal adopts an alternative font, e.g., a similar font or default font instead of the original font. In that case, the display layout or printing layout becomes different from what it is originally intended, because the alternative font has different size for each character from the original font.

In order to prevent this problem, there was a trial in which as many fonts as possible are installed in user terminals. However, that trial is insufficient, because there is a limit in capacity for storing binary data (i.e., font data) in user terminals and many fonts accompany big cost for font licenses.

SUMMARY OF THE INVENTION

It is, therefore, an object of the present invention to provide a font processing technique for a user terminal displaying or printing an e-document to approximately maintain original layout of the e-document even though lacking of original font of the e-document.

According to a first aspect of the present invention, there is provided a font processing method comprises steps of: (a) configuring local MBS table for a plurality of fonts, wherein the local MBS table includes reference size of each character for each font; (b) opening an e-document; (c) detecting original font which is used for each character of the e-document and selecting alternative font for replacing the original font; (d) obtaining reference sizes of characters in the original font and the alternative font from the local MBS table; (e) calculating, for each character of the e-document, alternative fontsize so as to maintain the original layout of the character even in the alternative font, wherein the alternative fontsize is calculated in proportion to the reference size of the character in the original font and the original fontsize of the character in the e-document, and in inverse proportional to the reference size of the character in the alternative font; (f) configuring each character of the e-document by the alternative font and the alternative fontsize; (g) representing each character of the e-document.

According to a second aspect of the present invention, there is provided a font processing method comprises steps of: (a) configuring local MBS table for at least one predetermined locally-operating alternative fonts, wherein the local MBS table includes reference size of each character for the alternative fonts; (b) when opening an e-document, detecting original font which is used for each character of the e-document and selecting alternative font for replacing the original font; (c) receiving MBS table for the original font from MBS server; (d) obtaining reference sizes of characters in the original font and the alternative font from the local MBS table; (e) calculating, for each character of the e-document, alternative fontsize so as to maintain the original layout of the character even in the alternative font, wherein the alternative fontsize is calculated in proportion to the reference size of the character in the original font and the original fontsize of the character in the e-document, and in inverse proportional to the reference size of the character in the alternative font; (f) configuring each character of the e-document by the alternative font and the alternative fontsize; (g) representing each character of the e-document.

In the present invention, the step (e) comprises the steps of: obtaining, for each character in the e-document, a ratio of MBS values by calculating the ratio between the reference sizes of the character in the original font and in the alternative font; multiplying, for each character in the e-document, the ratio of MBS values by the original fontsize; obtaining, for each character in the e-document, the alternative fontsize based on the result of the multiplication.

In the resent invention, the step (e) comprises the steps of: obtaining, for each character in the e-document, display size by multiplying the reference size in the original font and the original fontsize; dividing, for each character in the e-document, the display size by the reference size in the alternative font; obtaining, for each character in the e-document, the alternative fontsize based on the result of the division.

In the present invention, the characters may be selected from layout-sensitive portions in the e-document. Further, the step (a) may comprise the step of updating the local MBS table by receiving font list from the MBS server.

In the present invention, the font processing method may further comprise steps of: generating MBS table of a plurality of fonts which are used in authoring e-documents by arranging reference sizes of each character for each font; uploading the generated MBS table to MBS server; managing font list by assembling the uploaded MBS table.

Further, the computer-readable recording medium in the present invention records program for executing the font processing method for maintaining e-document layout as described above.

DESCRIPTION OF SPECIFIC EMBODIMENTS

Figure 1:
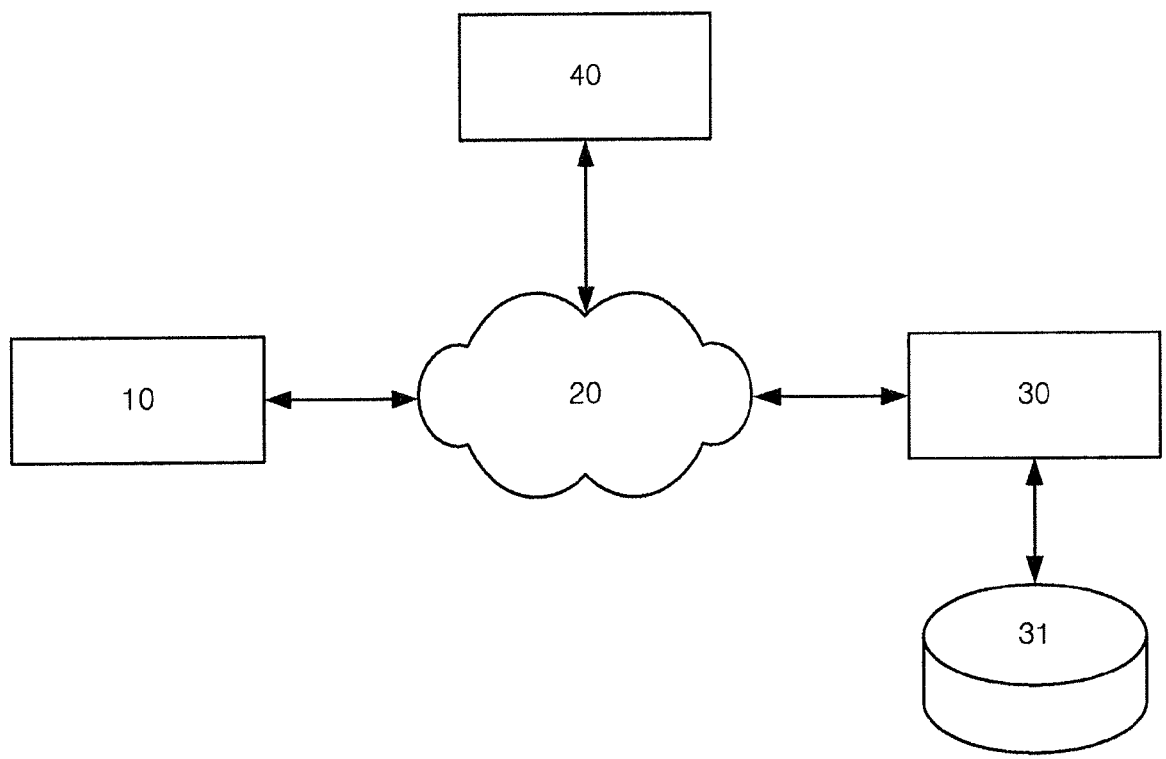
FIG. 1 shows basic structure of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 shows basic structure of the present invention in which a font processing method for maintaining e-document layout is implemented. Referring to FIG. 1, user terminal 10 communicates a MBS server 30 via network 20, and the MBS server 30 operates a database 31.

The user terminal 10 may be any device by which a user opens an e-document and enjoys its contents, and may be implemented as a smart phone, a smart pad, a digital set-top box etc. In the user terminal 10, a document viewer application or a document printing application is installed so as to open, display or print e-documents.

The font manager 40 provides font-related data. The font manager 40 may be a computer or a server which is operated by a font authoring company, an e-document author, a smart phone manufacturer (e.g., Samsung Electronics Co., Ltd., Apple Inc.), or an viewer application provider (e.g., Infraware Inc.).

The font manager 40 generates MBS table as font-related data, and uploads via Internet 20 the MBS table up to the MBS server 30 in order to let the MBS table be shared. A font management software of the font manager 40 preferably has uploading function in order to upload the MBS table be registered on font list as well as font-related data generating function.

The MBS server 30 includes database 31 so as to manage the font-related data (i.e., MBS table) as font list in which the font-related data is uploaded from the font manager 40, and to provide the font-related data to the user terminal 10. Preferable, the MBS server 30 is operated by a smart phone manufacturer or a viewer application provider.

Further, the font manager 40 and the MBS server 30 may be implemented into one device. In that case, the MBS server 30 has a function of generating a font-related data (i.e., MBS table) for a specific font. Then, responding to a request from the user terminal 10, the MBS server 30 may instantly generate and provide MBS table for a specific font in a real-time manner.

Figure 2:
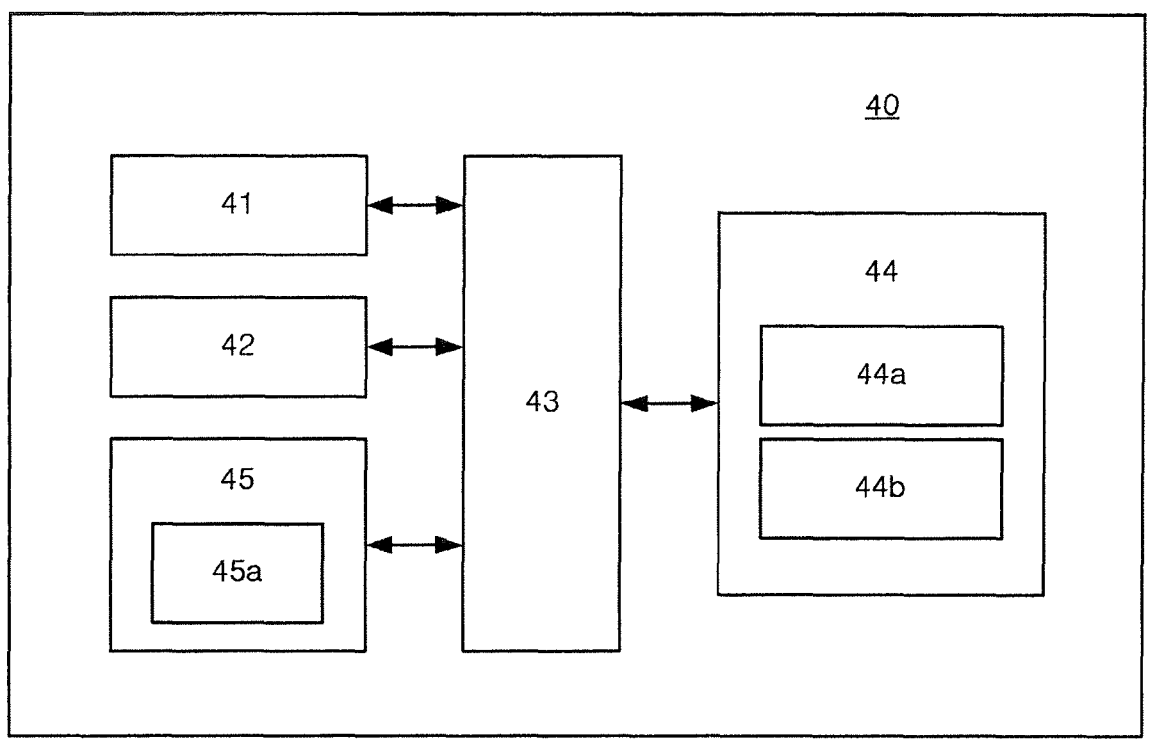
FIG. 2 is a block diagram of a font manager of the present invention.

FIG. 2 is a block diagram of a font manager 40 of the present invention in which a font processing method for maintaining e-document layout is implemented. The font manager 40 provides font-related data which is related to a plurality of original fonts for e-documents. Referring to FIG. 2, the font manager 40 includes I/O unit 41, transceiver unit 42, font controller 43, MBS generating unit 44 and storage unit 45. The MBS generating unit 44 includes MBS data generator 44a and MBS uploader 44b.

The MBS data generator 44a generates MBS table 45a for a plurality of original fonts which are used in the original e-document. The MBS table 45a is prepared for each font, and includes reference size information for each character for the font. The information in the MBS table 45a corresponds to display size for each character in that font option under base fontsize and resolution (e.g., base fontsize=10, base resolution=320×240).

This specification adopts twip as a unit of character size. The twip is a unit which is mapped by resolution (dpi). One twip is one inch divided by 1,440. In a general screen of 96 dpi, one pixel corresponds to 15 twip (i.e., 1,440/96). For a specific character in a specific font option (i.e., character 'A' in Arial font), the MBS engine 14 obtains a size value in twip units through graphic processing, and then converts the twip-unit size into pixel units through calculation and truncation or rounding off. For example, 150 twips corresponds to 10 pixels (150/15=10), 165 twips corresponds to 11 pixels (165/15=11), and 154 twips corresponds to 10 pixels (154/15=10.27).

In the present invention, character sizes in MBS table 45a are basically handled in twip units for achieving fine control. However, twip unit may let the numerals very big, which renders the computation overloaded. The present invention defines a unit of MBS (Mapping Base Size) for representing character size. In order to prevent the overload problem, it is preferable that the MBS unit has a moderate value, e.g., 1 MBS=200 twip.

Although a character has sizes in horizontal and vertical faces, it is further preferable that the MBS table 45a focuses on horizontal size of characters because e-document layout primarily depends on the horizontal size.

Further, the MBS table 45a includes ratio values to a standard font (e.g., 1.2 or 0.8) for character size information rather than physical values (e.g., 87 twips, 2.5 MBS). In that case, user terminal 10 shall execute floating-point computation when displaying e-documents. Therefore, information notation is chosen considering floating-point computation performance of the user terminal 10.

The MBS uploader 44b transmits the MBS table 45a which is generated by the MBS data generator 44a to the MBS server 30, by which the MBS table 45a is registered on font list in the database 31. The MBS server 30 manages MBS table 45a of a plurality of fonts as font list.

The font manager 40 generates MBS table 45a for each font and then provides the MBS table 45a to the MBS server 30. The MBS server 30 manages font list by assembling a plurality of MBS tables 45a. For example, font list may include MBS tables 45a for a plurality of fonts. The font list is provided from MBS server 30 to a user terminal 10. That is, the user terminal 10 becomes equipped with font data of a few basic fonts as well as font list for a plurality of fonts, by which the user terminal 10 may deal with all the fonts in handling e-documents.

The storage unit 45 provides space for storing codes or data for operation of the font manager 40 and may includes RAM, ROM, flash memory, MRAM, PRAM, FRAM, webdisk, cloud disk etc. The storage unit 45 temporarily stores the MBS table 45a. The MBS table 45a includes information of sizes for each character in a specific font when the character is shown in display screen. In this case, fontsize of characters and resolution of display screen is preferably set to base value (e.g., base fontsize=10, base resolution=320×240).

The font controller 43 controls the MBS generating unit 44 for generating and uploading of the MBS table 45a.

Figure 3:
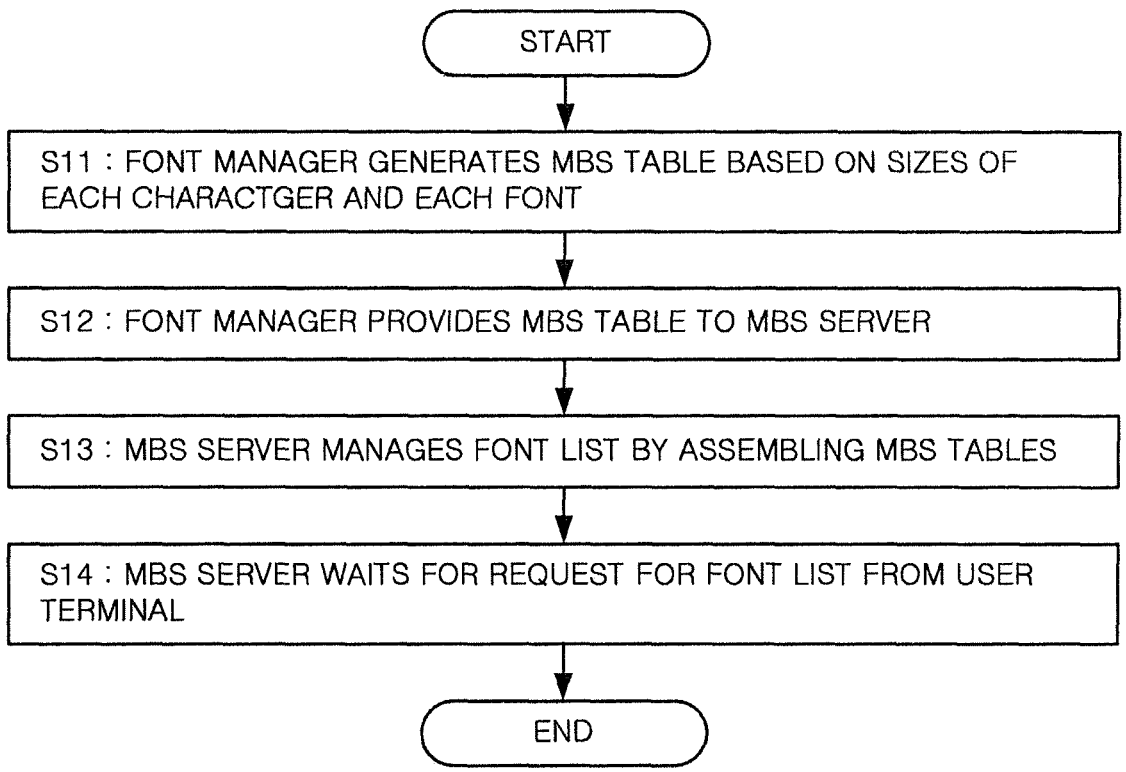
FIG. 3 shows a process of a MBS server to generate font list out of MBS tables in the present invention.

FIG. 3 shows a process of a MBS server 30 to generate font list out of MBS tables 45a in the present invention.

In step S11, MBS generating unit 44 of the font manager 40 generates MBS table 45a of a plurality of fonts which may be used in authoring e-documents by arranging sizes of each character for each font. Further, it is preferable that MBS table 45a includes recommendation of an alternative for each font.

In step S12, the MBS generating unit 44 provides the MBS table 45a to the MBS server 30 via network 20.

In step S13, the MBS server 30 manages font list in database 31 by assembling MBS tables 45a from preferably more than one font managers 40.

In step S14, the MBS server 30 waits for any request for the font list from a user terminal 10. By responding to the request, the font list is provided by the MBS server 30 to the user terminal 10. Then, the user terminal 10 properly uses the font list in font processing for maintaining layout when the user terminal 10 displays or prints an e-document.

Figure 4:
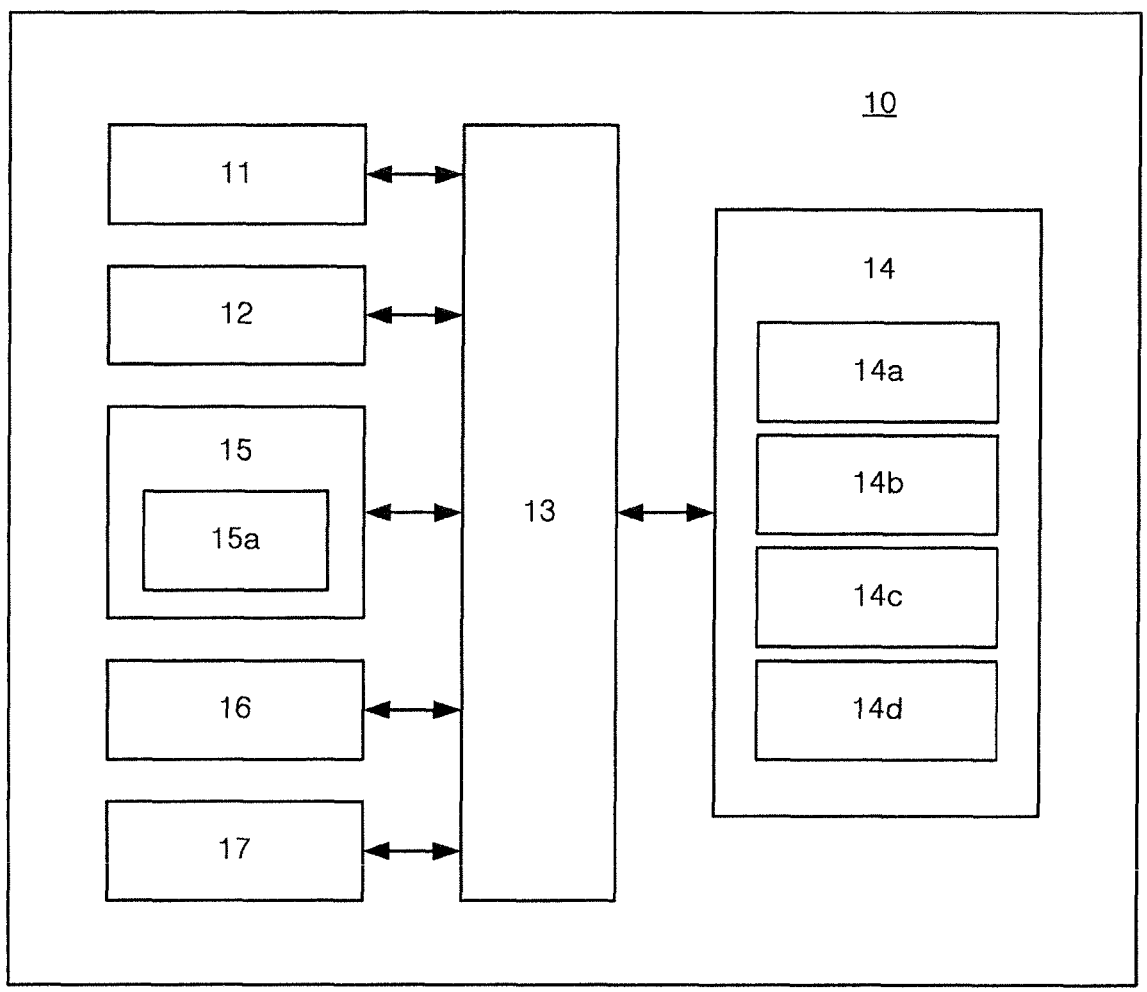
FIG. 4 is a block diagram of a user terminal of the present invention.

FIG. 4 is a block diagram of a user terminal 10 of the present invention in which a font processing method for maintaining e-document layout is implemented. Referring to FIG. 4, the user terminal 10 includes I/O unit 11, transceiver unit 12, terminal controller 13, MBS engine 14, storage unit 15, viewer app 16 and printing app 17.

Referring to FIG. 4, the MBS engine 14 includes font list sharer 14a, font-info extractor 14b, fontsize calculator 14c, fontsize calculator 14c and font implementer 14d, and the storage unit 15 has local MBS table 15a for a plurality of fonts.

The font list sharer 14a receives font list from MBS server 30, and then updates local MBS table 15a including size information of each character for each font. It is preferable that the font list sharer 14a updates the local MBS table 15a to the newest version by continuously receiving font list from the MBS server 30. However, in an embodiment, the user terminal 10 may insistently use a local MBS table 15a which is pre-installed in manufacturing process. The user terminal 10 does not have font data for all the fonts, but has the local MBS table 15a for those fonts. Further, the local MBS table 15a includes size information of each character in an alternative font.

When the user terminal 10 opens an e-document, the font-info extractor 14b extracts size information of each character in original fonts of the e-document from the local MBS table 15a, so that the viewer app 16 may properly implement the e-document. Further, when an alternative font is substituted for the original font due to lacking of font data of the original font in the user terminal 10, the font-info extractor 14b extracts size information of each character in the alternative font.

When a character of the e-document is represented with an alternative font instead of an original font due to, for example, lacking of the original font data in the user terminal 10, the fontsize calculator 14c calculates the fontsize to be set to the character in the alternative font. The fontsize calculator 14c refers to the size information (reference sizes in MBS unit) in the local MBS table 15a as to the character in the original font as well as in the alternative font. In this specification, the fontsizes in the original font and in the alternative font of a character are referenced as original fontsize and alternative fontsize, respectively.

For example, let's assume that a character 'A' has a reference size of 79 MBS in an original font (e.g., Century Gothic) and a reference size of 67 MBS in an alternative font (e.g., Times New Roman) in the local MBS table 15a. Let's further assume that an e-document 'Happydays.doc' includes an 'A' with fontsize of 16 (i.e., original fontsize=16). Then, the display size of the character 'A' would be 126.4 MBS (or 25,280 twips) by the calculation of (79×1.6=126.4). That is, the character 'A' with fontsize of 16 in the e-document 'Happydays.doc' would be displayed with the size of 126.4 MBS in the original font (Century Gothic).

Let's assume a situation that the 'A' is represented by the alternative font (Times New Roman) because the user terminal 10 fails to install font data of the original font (Century Gothic).

The character 'A' has a reference size of 67 MBS in the alternative font in the local MBS table 15a. Then, the character 'A' would have fontsize of 18 or 19 in the alternative font (i.e., alternative fontsize=18 or 19) by the calculation of (126.4÷67=1.88). The base fontsize of 10 shall be reminded. This means that a character 'A' with fontsize of 16 in the original font (Century Gothic) shall have fontsize of 18 or 19 in the alternative font (Times New Roman) in order to show a similar layout in display screen or printing materials.

Another approach of calculation would be available in order to obtain the same result. A ratio of MBS values in the original font and the alternative font can be multiplied by the original fontsize of the character 'A'. In the above example, the ratio of MBS values is 1.18 (i.e., 79÷67=1.18). Then, by multiplying the ratio of MBS values and the original fontsize, a value of 18.88 for the alternative fontsize may be obtained by the calculation of (1.18×16=18.88). Therefore, the character would have the fontsize of 18 or 19 in the alternative font.

A character 'A' is exemplarily described above. However, the same technology may be applied to other characters (e.g., B, C), numerals (e.g., 1, 2, 3) or special symbols (e.g., ♥, ~, ˆ).

The font implementer 14d configures display screen or printing layout based on the alternative font and the alternative fontsize for each character of e-documents. It is preferable that all the characters in the e-document shall be processed as described above. However, in case the computing load is too heavy so as to let the overall responsiveness of the user terminal 10 be lowered, only layout-sensitive portions, e.g., table or repetitive spaces, may be selectively processed.

When the font-info extractor 14b fails to obtain the size information (i.e., reference size in MBS unit) for the original fonts from the local MBS table 15a, the font implementer 14d configures the display screen with the alternative fonts as in the prior art technology.

By the font processing technique as described above, when opening an e-document, a user terminal 10 may use alternative software if it fails to prepare the software exactly matching to the e-document. For example, a user terminal 10 is opening a docx file which is authored by MS-WORD 2010. In case the user terminal 10 fails to prepare MS-WORD 2010, it may alternatively use WORD VIEWER for opening the docx file. The alternative software (i.e., WORD VIEWER) may lack of some of original fonts which are used for the docx file. Then, the alternative software may use alternative fonts instead of the lacking part of original fonts with executing the font processing as described above so as to approximately maintain the original layout of the docx file.

The storage unit 15 provides space for storing codes or data for operation of the terminal controller 13, specifically for storing the local MBS table 15a for a plurality of fonts. The storage unit 15 may be implemented as local storage in the user terminal 10 or as network storage.

The viewer app 16 represents a set of programs which open and display e-documents. In the present invention, the MBS engine 14 executes the font processing so that the viewer app 16 may provide a display screen whose layout is approximately maintained as original.

The printing app 17 represents a set of programs which print e-documents via a printer (not shown). In the present invention, the MBS engine 14 executes the font processing so that the printing app 17 may provide a printing results whose layout is approximately maintained as original.

Figure 5:
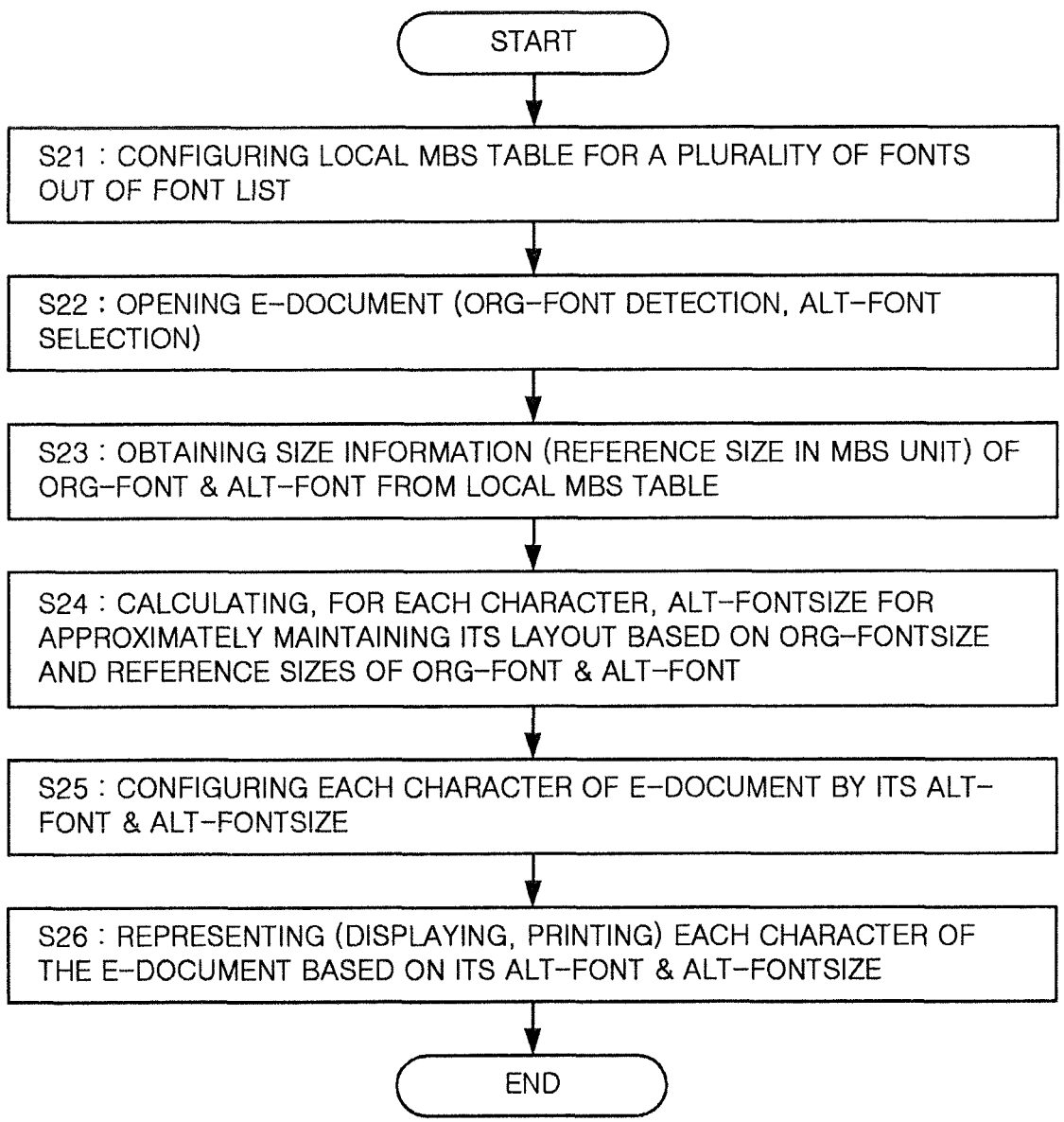
FIG. 5 shows one embodiment of layout-maintaining font process using MBS table in the present invention.

FIG. 5 shows one embodiment of layout-maintaining font process using MBS table in the present invention.

In step S21, the MBS engine 14 configures local MBS table 15a for a plurality of fonts out of font list. In an embodiment, the MBS engine 14 receives the font list from the MBS server 30, and then updates the local MBS table 15a so that the local MBS table 15a includes reference size of each character for each font.

That is, the MBS engine 14 continuously receives font list from the MBS server 30, and then prepare the local MBS table 15a for each font in the storage unit 15. Preferably, the storage unit 15 of the user terminal 10 does not have font data (binary data) for all kinds of fonts. Alternatively, the local MBS table 15a may be established when the user terminal 10 is manufactured or when the viewer app 16 is installed. In this case, the local MBS table 15a may not be updated. The important thing in the present invention is that the user terminal 10 manages the local MBS table 15a for a plurality of fonts for upcoming font processing.

In step S22, the viewer app 16 opens an e-document. Then, the MBS engine 14 detects original fonts of the e-document, and selects alternative fonts for replacing the original font. The alternative fonts are selected in case the original fonts of the e-document are inappropriate to use for any reason.

In step S23, the MBS engine 14 obtains size information (reference size in MBS unit) of the original fonts from the local MBS table 15a. Further, the MBS engine 14 also obtains size information of the alternative fonts from the local MBS table 15a.

In step S24, for each character of the e-document the MBS engine 14 calculates fontsize in the alternative font (i.e., alternative fontsize) which approximately maintains the original layout of the character even in the alternative font, the MBS engine 14 calculates the alternative fontsize for a character based on the MBS value (i.e., reference size) of the character in the original font, the MBS value of the character in the alternative font, and the fontsize of the character in the e-document (i.e., original fontsize). The detailed process for calculating the alternative fontsize is described above with reference to the fontsize calculator 14c.

In step S25, the MBS engine 14 configures each character of the e-document by its alternative font and alternative fontsize.

In step S26, the MBS engine 14 represents each character of the e-document based on its alternative font and its alternative fontsize. The representation includes displaying in screen and printing in papers.

Figure 6:
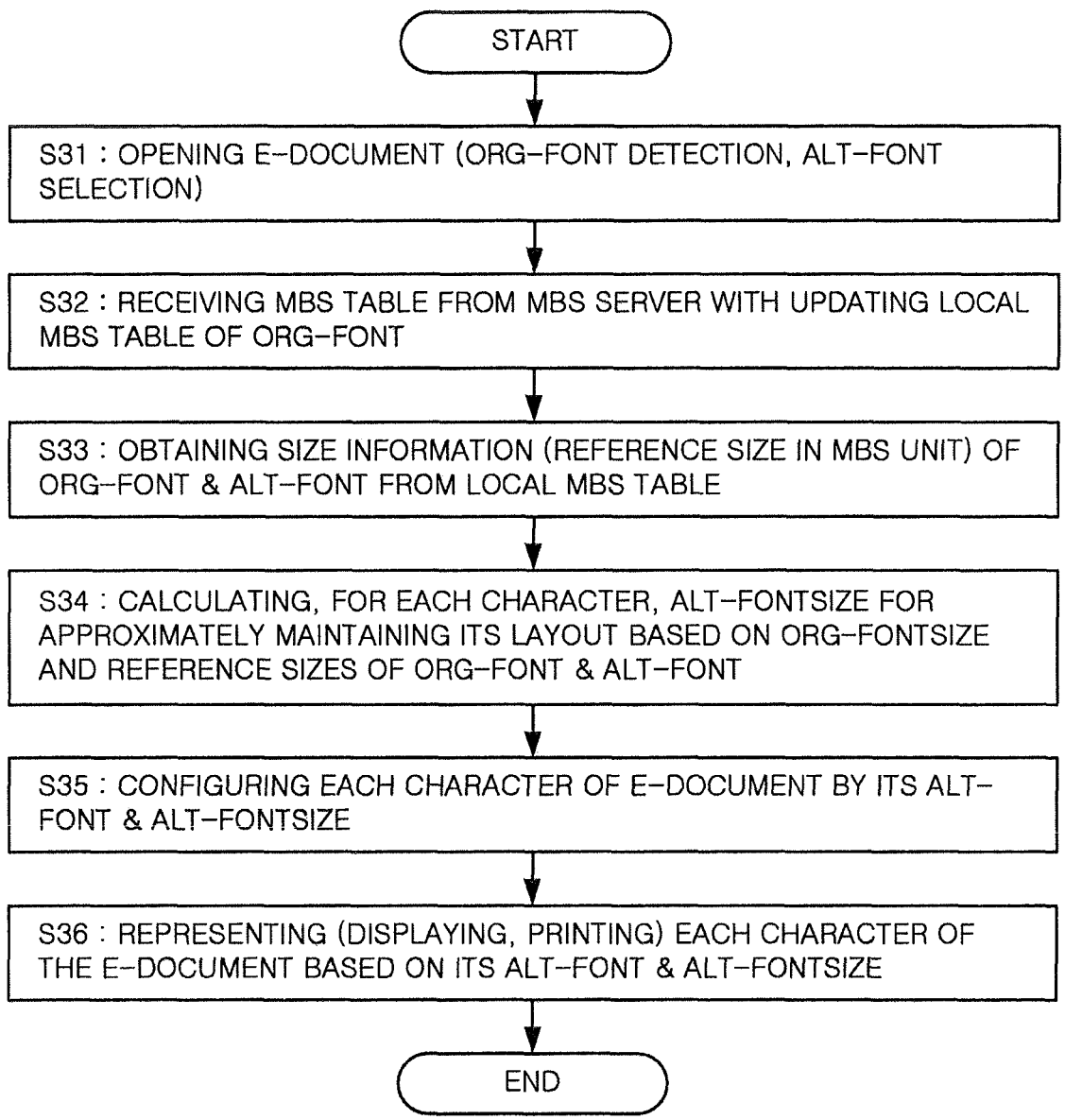
FIG. 6 shows a second embodiment of layout-maintaining font process using MBS table in the present invention.

FIG. 6 shows a second embodiment of layout-maintaining font process using MBS table in the present invention.

In step S31, the viewer app 16 opens an e-document. Then, the MBS engine 14 detects original fonts of the e-document, and selects alternative fonts for replacing the original font. The alternative fonts are selected in case the original fonts of the e-document are inappropriate to use for any reason.

In step S32, the MBS engine 14 requests MBS table of the original font to the MBS server 30. Then, the MBS engine 14 receives the MBS table of the original font from the MBS server 30, and then updates the local MBS table 15a. If the MBS server 30 prepares the MBS table of the original font in advance, the MBS server 30 may retrieve the MBS table from database 31 and then provide it to the user terminal 10. However, if the MBS server 30 fails to prepare the MBS table of the original font, the MBS server 30 may receive the MBS table from the font manager 40 and then provide it to the user terminal 10. In the latter case, the font manager 40 may generate the MBS table when requested in a real-time manner. Further, the font manager 40 may be implemented as a functional module of the MBS server 30.

In step S33, the MBS engine 14 obtains size information (reference size in MBS unit) of the original fonts from the local MBS table 15a. Further, the MBS engine 14 also obtains size information of the alternative fonts from the local MBS table 15a.

Although the MBS table for the alternative font may be obtained in step S32, it is more preferable that the user terminal 10 pre-installs the MBS table of the alternative font. Because the user terminal 10 generally supports a few kinds of alternative fonts, it is easy to pre-install the MBS table for the a few kinds of alternative fonts in the local MBS table 15a. Alternatively, the local MBS table 15a may be updated in advance by receiving MBS table of the alternative font from the MBS server 30 preferably before opening the e-document.

The steps S34~S36 of FIG. 6 similarly correspond to the steps S24~S26 of FIG. 5, whose detailed description is omitted.

According to the present invention, when a user terminal 10 displays or prints an e-document, the original layout of the e-document is maintained even though the user terminal 10 fails to install original fonts. Therefore, the meaning of the e-document is exactly shown as intended by the author, and the visibility and legibility of the e-document is highly enhanced.

According to the present invention, the cost for installing a plurality of fonts in the user terminal 10 may be much lowered, for example font licensing fee and material cost for mass-storage flash memory. Further, since the user terminal 10 does not load massive amount of font data, the responsiveness of the user terminal 10 in operating the e-document is highly enhanced.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

The preferred embodiment of the present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A font processing method for maintaining an electronic document (e-document) layout, the method comprising:
    configuring a local mapping base size (MBS) table for a plurality of fonts, wherein the local MBS table includes a reference size of each character for each font;
    opening an e-document;
    detecting an original font used for each character of the e-document and selecting an alternative font for replacing the original font;
    obtaining reference sizes of characters in the original font and the alternative font from the local MBS table;
    calculating, for each character of the e-document, an alternative font size to maintain an original layout of the character in the alternative font, wherein the alternative font size is calculated in proportion to the reference size of the character in the original font and an original font size of the character in the e-document, and in inverse proportion to the reference size of the character in the alternative font;
    configuring each character of the e-document by the alternative font and the alternative font size; and
    representing each character of the e-document, wherein the representing each character of the e-document comprises:
  obtaining, for each character in the e-document, a ratio of MBS values by calculating a ratio between the reference sizes of the characters in the original font and in the alternative font;
  multiplying, for each character in the e-document, the ratio of MBS values by the original font size; and
  obtaining, for each character in the e-document, the alternative font size based on the result of the multiplication.

2. The font processing method according to claim 1, wherein the calculating the alternative font size comprises:
  obtaining, for each character in the e-document, a display size by multiplying the reference size in the original font and the original font size;
  dividing, for each character in the e-document, the display size by the reference size in the alternative font; and
  obtaining, for each character in the e-document, the alternative font size based on the result of the division.

3. The font processing method according to claim 1, wherein the characters are selected from layout-sensitive portions in the e-document.

4. The font processing method according to claim 1, wherein the configuring the local MBS table comprises updating the local MBS table by receiving a font list from an MBS server.

5. The font processing method according to claim 4, further comprising:
  generating an MBS table of a plurality of fonts used in authoring e-documents by arranging the reference sizes of each character for each font;
  uploading the generated MBS table to the MBS server; and
  managing the font list by assembling the uploaded MBS table.

6. A font processing method for maintaining an electronic document (e-document) layout, the method comprising:
  configuring a local mapping base size (MBS) table for one or more predetermined locally-operating alternative fonts, wherein the local MBS table includes a reference size of each character for the alternative fonts;
  when opening an e-document, detecting an original font used for each character of the e-document and selecting an alternative font for replacing the original font;
  receiving an MBS table for the original font from an MBS server;
  obtaining reference sizes of characters in the original font and the alternative font from the local MBS table;
  calculating, for each character of the e-document, an alternative font size to maintain an original layout of the character in the alternative font, wherein the alternative font size is calculated in proportion to the reference size of the character in the original font and an original font size of the character in the e-document, and in inverse proportion to the reference size of the character in the alternative font;
  configuring each character of the e-document by the alternative font and the alternative fontsize; and
  representing each character of the e-document,
  wherein the representing each character of the e-document comprises:
    obtaining, for each character in the e-document, a ratio of MBS values by calculating a ratio between the reference sizes of the characters in the original font and in the alternative font;
    multiplying, for each character in the e-document, the ratio of MBS values by the original font size; and
    obtaining, for each character in the e-document, the alternative font size based on the result of the multiplication.

7. The font processing method according to claim 6, wherein the calculating the alternative font size comprises:
  obtaining, for each character in the e-document, a display size by multiplying the reference size in the original font and the original font size;
  dividing, for each character in the e-document, the display size by the reference size in the alternative font; and
  obtaining, for each character in the e-document, the alternative font size based on the result of the division.

8. The font processing method according to claim 6, wherein the characters are selected from layout-sensitive portions in the e-document.

9. A non-transitory computer-readable recording medium storing a program for executing the font processing method for maintaining e-document layout according to claim 1.

10. A non-transitory computer-readable recording medium storing a program for executing the font processing method for maintaining e-document layout according to claim 6.

* * * * *